(12) United States Patent
Song et al.

(10) Patent No.: US 8,175,396 B2
(45) Date of Patent: May 8, 2012

(54) METHOD AND APPARATUS FOR ENCODING AND DECODING MULTI-VIEW IMAGES BASED ON GLOBAL DISPARITY VECTOR

(75) Inventors: Hak-sup Song, Suwon-si (KR);
Woo-sung Shim, Yongin-si (KR);
Young-ho Moon, Suwon-si (KR);
Jong-bum Choi, Yangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1104 days.

(21) Appl. No.: 11/968,868

(22) Filed: Jan. 3, 2008

(65) Prior Publication Data
US 2008/0159638 A1    Jul. 3, 2008

Related U.S. Application Data

(60) Provisional application No. 60/883,190, filed on Jan. 3, 2007.

(30) Foreign Application Priority Data

Apr. 5, 2007  (KR) .................. 10-2007-0033781
Dec. 12, 2007  (KR) .................. 10-2007-0129086

(51) Int. Cl.
*G06K 9/36* (2006.01)
(52) U.S. Cl. ..................... 382/232; 382/236
(58) Field of Classification Search ............. 382/154, 382/232, 233, 236; 375/240, 240.12–240.17, 375/240.24, 240.27
See application file for complete search history.

(56) References Cited

U.S. PATENT DOCUMENTS

| | | | |
|---|---|---|---|
| 5,790,206 A * | 8/1998 | Ju | 375/240.14 |
| 5,991,443 A * | 11/1999 | Gallery et al. | 382/232 |
| 6,055,274 A | 4/2000 | McVeigh | |
| 7,050,500 B2 * | 5/2006 | Sun et al. | 375/240.16 |
| 2003/0202592 A1 | 10/2003 | Sohn et al. | |
| 2006/0262856 A1 | 11/2006 | Wu et al. | |

FOREIGN PATENT DOCUMENTS

JP          09261653       10/1997
KR    10-2006-0065553 A    6/2006

OTHER PUBLICATIONS

Weigand, T., et al., "Meeting Report, Draft 7", Joint Video Team (JVT) of ISO/IEC MPEG & ITU-T VCEG (ISO/IEC JTC1/SC29/WG11 and ITU-T SG16 Q.6), 2006, pp. 1-82, XP 007911080.

(Continued)

*Primary Examiner* — Duy M Dang
(74) *Attorney, Agent, or Firm* — Sughrue Mion, PLLC

(57) ABSTRACT

A method and apparatus for encoding and decoding multi-view images. The multi-view image encoding method selects a block corresponding to a current block from another picture having a view-point which is different from a view-point of a current picture to which the current block belongs, on the basis of a global disparity vector representing a global disparity between the current picture and the other picture; and encodes the current block on the basis of block information of a block from among the selected block and blocks adjacent to the selected block. Accordingly, multi-view images can be encoded in consideration of the individual differences between the appearances of objects as well as global disparities between view-points.

38 Claims, 6 Drawing Sheets

OTHER PUBLICATIONS

Koo, H.-S., et al., "Motion Skip Mode for MVC", Joint Video Team (JVT) of ISO/IEC MPEG & ITU-T VCEG (ISO/IEC JTC1/SC29/WG11 and ITU-T SG16 Q.6), 2006, pp. 1-7, XP 030006737.

Izquierdo, M. E., et al., "Stereo image analysis for multi-viewpoint telepresence applications", Signal Processing: Image Communication, 1998, pp. 231-254, vol. 11, No. 3, XP 004107305.

Song, H.-S., et al., "Macroblock Information Skip for MVC", Joint Video Team (JVT) of ISO/IEC MPEG & ITU-T VCEG (ISO/IEC JTC1/SC29/WG11 and ITU-T SG16 Q.6), 2007, pp. 1-7, XP 030006860.

Yang, H., et al., "Regional Disparity Est/Comp for MVC", Joint Video Team (JVT) of ISO/IEC MPEG & ITU-T VCEG (ISO/IEC JTC1/SC29/WG11 and ITU-T SG16 Q.6), 2006, pp. 1-16, XP 030006693.

Ho, Y.-S., et al., "Global Disparity Compensation for Multi-view Video Coding", Joint Video Team (JVT) of ISO/IEC MPEG & ITU-T VCEG (ISO/IEC JTC1/SC29/WG11 and ITU-T SG16 Q.6), 2006, pp. 1-16, XP 030006746.

Office Action issued Apr. 8, 2011, in Chinese Application No. 200880001732.5.

Chinese Office Action issued on Oct. 19, 2011 in counterpart Chinese Application No. 200880001732.5.

Communication dated Feb. 13, 2008 issued in counterpart Korean Application No. 10-2007-0033781.

* cited by examiner

FIG. 7

```
macroblock_layer_mvc_extension( ) {
    mbinfo_skip_flag
    if (mbinfo_skip_flag)
        ref_mb_pos
    else
    {
        mb_type
        if( mb_type= =I_PCM ) {
            while( !byte_aligned( ) )
                pcm_alignment_zero_bit
            for( i = 0; i < 256; i++ )
                pcm_sample_luma[ i ]
            for( i = 0; i < 2 * MbWidthC * MbHeightC; i++ )
                pcm_sample_chroma[ i ]
        } else {
            NoSubMbPartSizeLessThan8x8Flag = 1
            if( mb_type!=I_NxN&&
                MbPartPredMode( mb_type, 0 )!=Intra_16x16&&
                NumMbPart( mb_type )= =4 ) {
                sub_mb_pred( mb_type )
                for( mbPartIdx = 0; mbPartIdx < 4; mbPartIdx++ )
                    if( sub_mb_type[ mbPartIdx ]!=B_Direct_8x8 ) {
                        if( NumSubMbPart( sub_mb_type[ mbPartIdx ] )>1 )
                            NoSubMbPartSizeLessThan8x8Flag = 0
                    } else if( !direct_8x8_inference_flag )
                        NoSubMbPartSizeLessThan8x8Flag = 0
            } else {
                if( transform_8x8_mode_flag&&mb_type= =I_NxN )
                    transform_size_8x8_flag mb_pred( mb_type )
            }
        }
    }
    ---- The remaining parts are identical to JMVM 1.0----
}
```

US 8,175,396 B2

METHOD AND APPARATUS FOR ENCODING AND DECODING MULTI-VIEW IMAGES BASED ON GLOBAL DISPARITY VECTOR

CROSS-REFERENCE TO RELATED PATENT APPLICATION

This application claims priority from Korean Patent Application No. 10-2007-0033781, filed on Apr. 5, 2007, in the Korean Intellectual Property Office, Korean Patent Application No. 10-2007-0129086, filed on Dec. 12, 2007, in the Korean Intellectual Property Office and U.S. Provisional Application No. 60/883,190, filed on Jan. 3, 2007, the disclosures of which are incorporated herein in their entirety by reference.

BACKGROUND OF THE INVENTION

1. Field of the Invention

Methods and apparatuses consistent with the present invention relate to encoding and decoding multi-view images, and more particularly, to a method and apparatus for encoding and decoding multi-view images with a high efficiency using a global disparity vector.

2. Description of the Related Art

Multi-view image encoding is performed by receiving image signals from a plurality of cameras that provide multi-view images and encoding the image signals. The multi-view images are compression-encoded using temporal correlation and spatial correlation between cameras (inter-view).

Temporal prediction is performed using temporal correlation between pictures at the same view-point, which have been taken at different times, and spatial prediction is performed using spatial correlation between pictures having different view-points, which have been taken at the same time.

A method of using such spatial correlation includes a prediction encoding method using a global disparity vector. The prediction encoding method using the global disparity vector will be described in detail with reference to FIGS. 1A and 1B, below.

FIGS. 1A and 1B are views for illustrating a global disparity between two images that are taken at different view-points.

FIGS. 1A and 1B show two images 110 and 130 having different view-points, which have been taken at the same time by two cameras that are positioned at different locations. In the case of multi-view images, multi-view images having different view-points have a global disparity due to the location difference of cameras which correspond to the different view-points. Referring to FIGS. 1A and 1B, the left part 120 of the image 110 illustrated in FIG. 1A is not seen in FIG. 1B. Also, the right part 140 of the image 130 illustrated in FIG. 1B is not seen in FIG. 1A. As a result, if the image 110 illustrated in FIG. 1A is shifted to the right side, the image 110 will be similar to the image 130 illustrated in FIG. 1B.

A global disparity between the image 110 of FIG. 1A and the image 130 of FIG. 1B is generated by the difference in locations of cameras that have photographed the corresponding scene at different view-points. A method of prediction-encoding a current picture using a vector representing such a global disparity is called "global disparity compensation".

In global disparity compensation, a current picture is prediction-encoded with reference to a reference picture, wherein the reference picture is moved in a one-dimensional or two-dimensional direction by a global disparity between the reference picture and the current picture. However, the global disparity compensation does not consider the individual difference of each object which is included in the reference picture and the current picture.

FIGS. 2A, 2B, and 2C are views for illustrating disparities of objects included in images that have been captured at different view-points. As illustrated in FIG. 2A, a case where two cameras photograph objects that are spaced apart from each other will be described as an example, below.

An image photographed by a first camera 210 is illustrated in FIG. 2B, and an image photographed by a second camera 220 is illustrated in FIG. 2C. There is little difference in the appearance of an object 230 which is located near the cameras 210 and 220 between the images having the different view-points, while there is a great difference in the appearance of an object 240 which is relatively far from the cameras 210 and 220 between the images having the different view-points.

Although a global disparity between images having different view-points is considered when motion compensation is performed, objects included in the images having the different view-points can have different disparities other than a global disparity. Accordingly, a multi-view image encoding method considering such a problem is needed.

SUMMARY OF THE INVENTION

The present invention provides a method and apparatus for encoding and decoding multi-view images, considering the individual differences in the appearance of objects included in the multi-view images, and a computer-readable recording medium having embodied thereon a program for executing the multi-view image encoding/decoding method.

According to an aspect of the present invention, there is provided a multi-view image encoding method comprising selecting a block corresponding to a current block from another picture having a view-point which is different from a view-point of a current picture to which the current block belongs, on the basis of a global disparity vector representing a global disparity between the current picture and the other picture; and encoding the current block on the basis of block information of a block from among the selected block and blocks adjacent to the selected block.

The block information may comprise at least one of a motion vector, a reference index, and a prediction mode used to encode a block from among the selected block and the blocks adjacent to the selected block.

The encoding of the current block may comprise encoding flag information indicating that the current block is encoded on the basis of block information of a block from among the selected block and the blocks adjacent to the selected block.

The encoding of the current block may further comprise encoding index information indicating which block from among the selected block and the blocks adjacent to the selected block, corresponds to the block information used to encode the current block.

The encoding of the current block may further comprise entropy-encoding the flag information and the index information.

According to another aspect of the present invention, there is provided a multi-view image encoding apparatus comprising a selection unit which selects a block corresponding to a current block from another picture having a view-point which is different from a view-point of a current picture to which the current block belongs, on the basis of a global disparity vector representing a global disparity between the current picture and the other picture; and an encoding unit which encodes the current block on the basis of block information of a block from among the selected block and blocks adjacent to the selected block.

According to another aspect of the present invention, there is provided a multi-view image decoding method comprising receiving a bit stream including data about a current block which has been encoded on the basis of block information of a block from among a selected block and blocks adjacent to the selected block, wherein the selected block corresponding to the current block is selected from another picture having a view-point which is different from a view-point of a current picture to which the current block belongs, on the basis of a global disparity vector representing a global disparity between the current picture and the other picture; extracting the data about the current block from the bit stream; and restoring the current block on the basis of the data about the current block.

The data about the current block may comprise flag information indicating that the current block is encoded on the basis of the block information of a block from among the selected block and the blocks adjacent to the selected block.

The data about the current block may further comprise index information indicating which block from among the selected block and the blocks adjacent to the selected block, corresponds to the block information used to encode the current block.

According to another aspect of the present invention, there is provided a multi-view image decoding apparatus comprising a decoding unit which receives a bit stream including data about a current block which has been encoded on the basis of block information of a block from among a selected block and blocks adjacent to the selected block, wherein the selected block corresponding to the current block is selected from another picture having a view-point which is different from a view-point of a current picture to which the current block belongs, on the basis of a global disparity vector representing a global disparity between the current picture and the other picture, and which extracts the data about the current block from the bit stream; and a restoring unit which restores the current block on the basis of the data about the current block.

According to another aspect of the present invention, there is provided a multi-view image encoding method comprising selecting a block corresponding to a current block from another picture having a view-point which is different from a view-point of a current picture to which the current block belongs, on the basis of a global disparity vector representing a global disparity between the current picture and the other picture; encoding the current block according to an encoding mode in which a block is encoded on the basis of block information of the selected block; and encoding flag information indicating that at least one of blocks contained in a current slice to which the current block belongs has been encoded according to the encoding mode.

According to another aspect of the present invention, there is provided a multi-view image encoding apparatus comprising a selection unit which selects a block corresponding to a current block from another picture having a view-point which is different from a view-point of a current picture to which the current block belongs, on the basis of a global disparity vector representing a global disparity between the current picture and the other picture; and an encoding unit which encodes the current block according to an encoding mode in which a block is encoded on the basis of block information of the selected block, wherein the encoding unit further encodes flag information indicating that at least one of blocks contained in a current slice to which the current block belongs has been encoded according to the encoding mode.

According to another aspect of the present invention, there is provided a multi-view image decoding method comprising receiving a bit stream including data about a current block which has been encoded on the basis of block information of a block corresponding to the current block, wherein the corresponding block is selected from another picture having a view-point which is different from a view-point of a current picture to which the current block belongs, on the basis of a global disparity vector representing a global disparity between the current picture and the other picture; extracting data regarding a residual block of the current block and information regarding an encoding mode from the received bitstream; and restoring the current block on the basis of the data about the residual block and the information regarding the encoding mode, wherein the information regarding the encoding mode comprises flag information indicating that the at least one of blocks included in a current slice to which the current block belongs has been encoded according to the encoding mode.

According to another aspect of the present invention, there is provided a multi-view image decoding apparatus comprising a decoding unit which receives a bit stream including data about a current block which has been encoded on the basis of block information of a block corresponding to the current block, and then extracts data about a residual block of the current block and information regarding an encoding mode from the bit stream, where the corresponding block is selected from another picture having a view-point which is different from a view-point of a current picture to which the current block belongs, on the basis of a global disparity vector representing a global disparity between the current picture and the other picture; and a restoring unit which restores the current block on the basis of the data about the residual block and the information regarding the encoding mode, wherein the information regarding the encoding mode comprises flag information indicating that at least one of blocks included in a current slice to which the current block belongs has been encoded according to the encoding mode.

According to another aspect of the present invention, there is provided a computer-readable recording medium having embodied thereon a program for executing the above methods.

BRIEF DESCRIPTION OF THE DRAWINGS

The above and other features and advantages of the present invention will become apparent and more readily appreciated from the following description of the exemplary embodiments, taken in conjunction with the accompanying drawings of which:

FIG. 7 illustrates syntax for generating block information, according to an exemplary embodiment of the present invention;

DETAILED DESCRIPTION OF EXEMPLARY EMBODIMENTS OF THE INVENTION

Hereinafter, exemplary embodiments of the present invention will be described in detail with reference to the accompanying drawings.

Figure 1A:
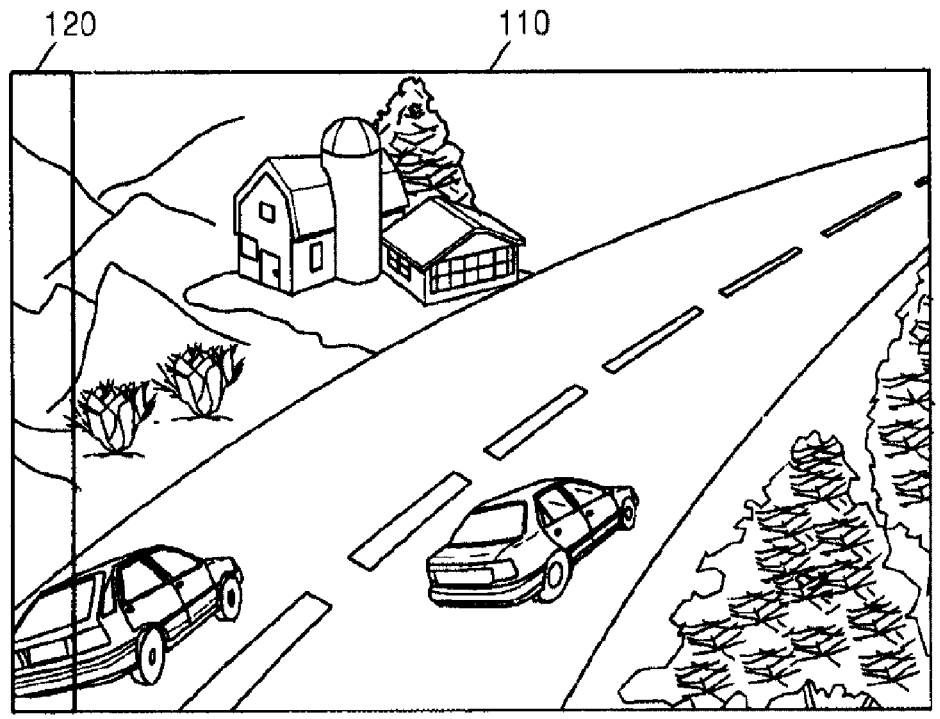
FIGS. 1A and 1B are views for illustrating a global disparity between images having different view-points.
Figure 1B:
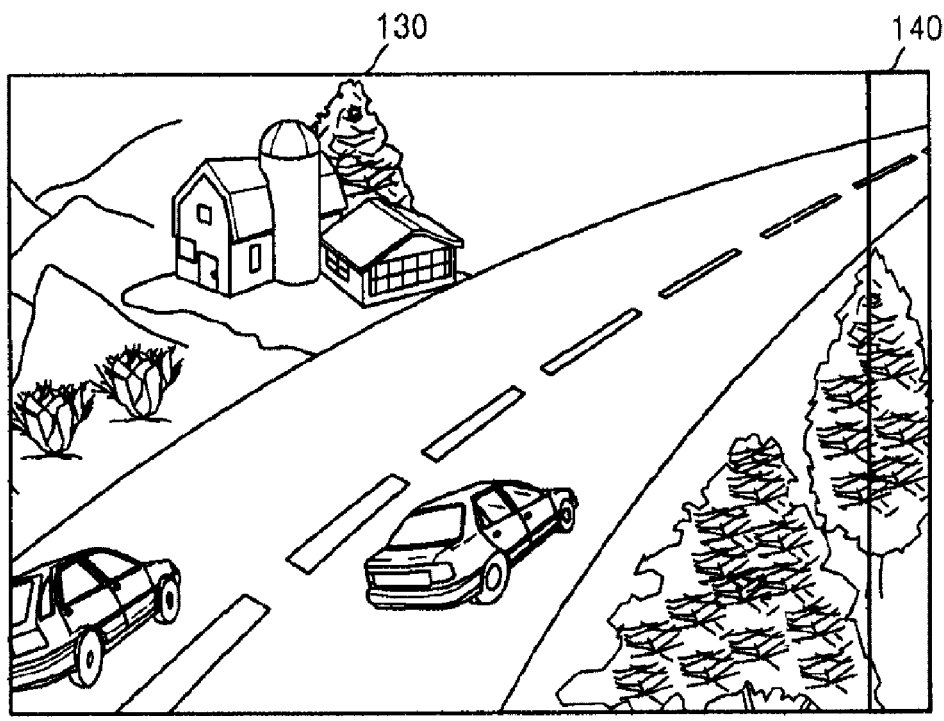
Figure 2A:
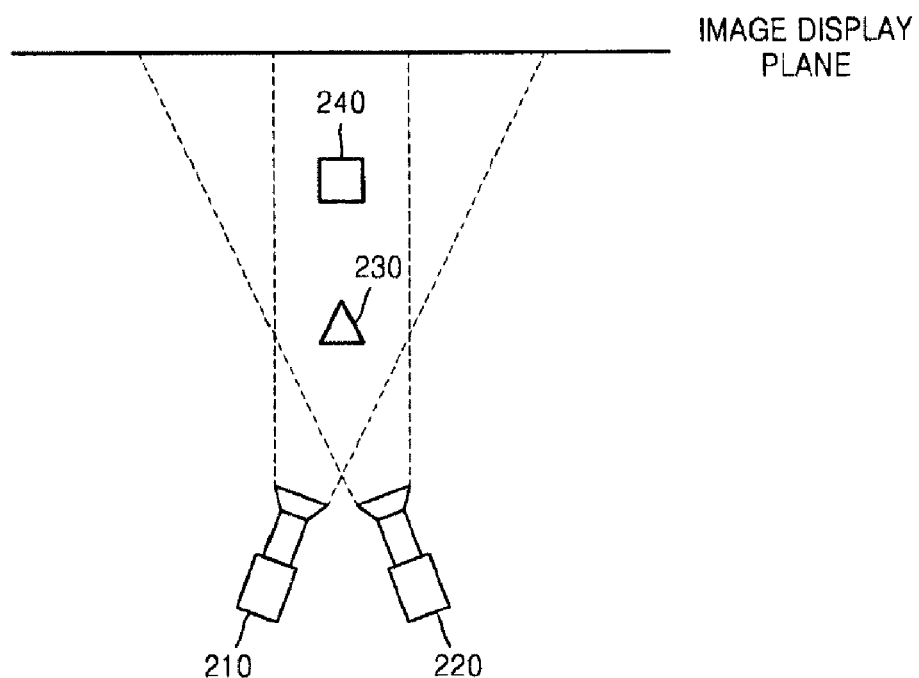
FIGS. 2A, 2B, and 2C are views for illustrating the individual differences in the appearance of objects included in images having different view-points.
Figure 2B:
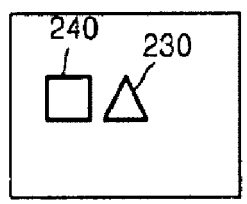
Figure 2C:
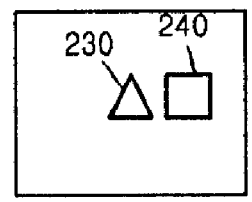
Figure 3:
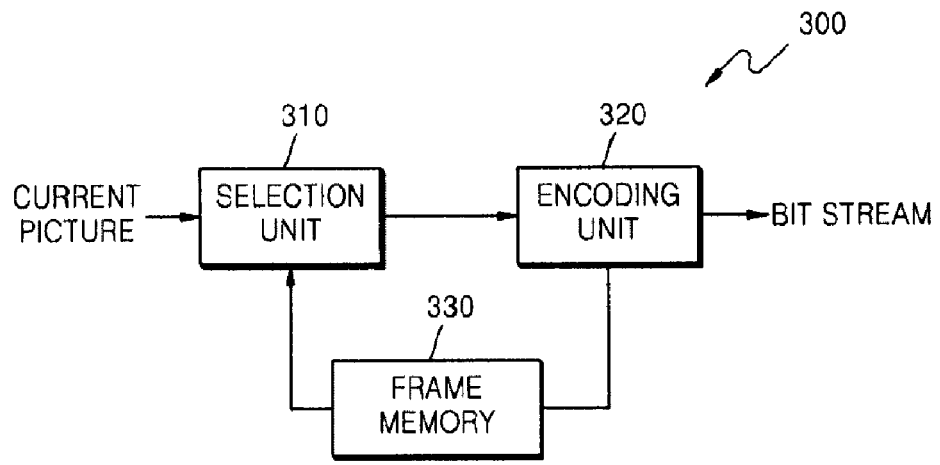
FIG. 3 is a block diagram of a multi-view image encoding apparatus according to an exemplary embodiment of the present invention.

FIG. 3 is a block diagram of a multi-view image encoding apparatus 300 according to an exemplary embodiment of the present invention.

The multi-view image encoding apparatus 300 includes a selection unit 310, an encoding unit 320, and a frame memory 330.

The selection unit 310 selects a block corresponding to a current block from another picture having a view-point which is different from a view-point of a current picture to which the current block belongs, on the basis of a vector representing a global disparity between the current picture and the other picture. In detail, the selection unit 310 selects a macro block corresponding to a current macro block from another picture having a neighboring view-point which is different from and adjacent to a view-point of a current picture to which the current block belongs, according to a global disparity vector representing a global disparity between the current picture and the other picture which has been previously encoded.

The other picture having the neighboring view-point has been previously encoded in units of predetermined blocks. Block information of the other picture is generated in units of encoded blocks. In order to encode a current block using the block information of another block, a block having block information has to be selected as a block corresponding to the current block. Accordingly, if a global disparity vector is not a multiple of the size of a current block in an x-axis or y-axis direction, a block corresponding to the current block is selected according to the result obtained by rounding the global disparity vector.

For example, it is assumed that a current block is a 16×16 macro block, and another picture having a view-point which is different from a view-point of a current picture to which the current block belongs is encoded by generating block information in units of 16×16 macro blocks. If a global disparity vector is calculated to be (x, y)=(10, 12), a block corresponding to the current block becomes a block at a location moved by (x, y)=(10, 12) from the location of the current block in the other picture having the different view-point. However, "10" and "12" are not multiples of the size of the current block, and the block at the location moved by (x, y)=(10, 12) is located over a plurality of macro blocks and has no independent block information. Accordingly, by rounding "10" and "12" to "16", a macro block at a location moved by (x, y)=(16, 16) from the location of the current macro block is selected from the other picture having the different view-point (that is, a neighboring view-point).

The method of selecting the block corresponding to the current block by rounding the X and Y components of the global disparity vector is provided as an example, and the present invention is not limited thereto.

The selection unit 310 can also use a variety of methods for searching for a neighboring view-point to select a block corresponding to a current block, and can determine a neighboring view-point using different methods for each sequence of multi-view images. This operation will be described in detail with reference to FIG. 4, below.

Figure 4:
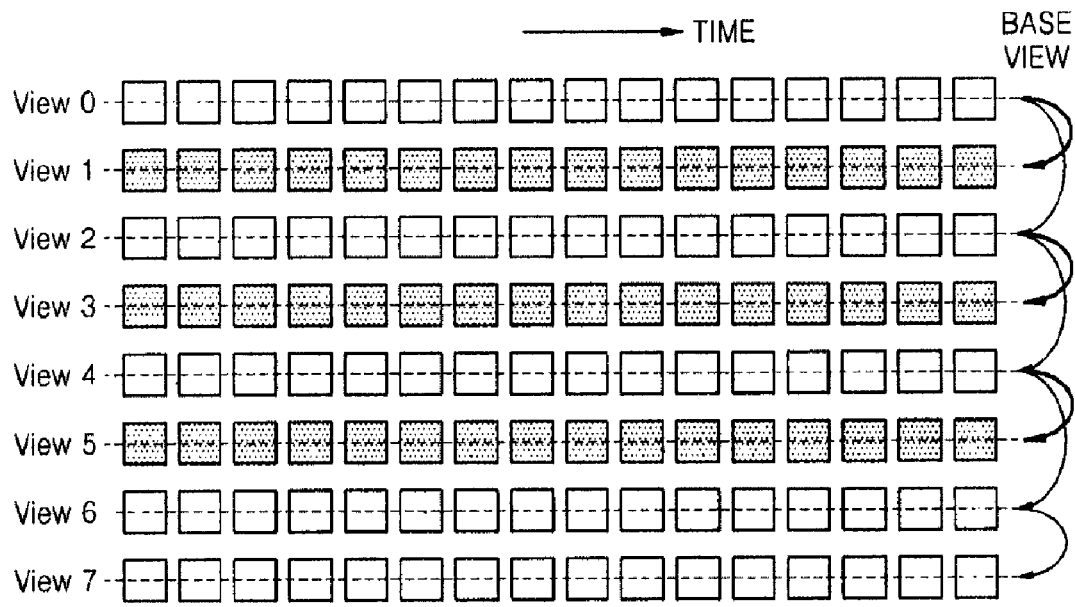
FIG. 4 is a view for illustrating a method of determining a neighboring view-point, according to an exemplary embodiment of the present invention.

FIG. 4 is a view for illustrating a method of determining a neighboring view-point, according to an exemplary embodiment of the present invention. In detail, FIG. 4 is a view for explaining a method of determining a neighboring view-point to search for a block corresponding to a current block in multi-view images for 8 view-points.

Referring to FIGS. 3 and 4, if the current block belongs to an image having a view-point 1, the multi-view image encoding apparatus 300 selects a block corresponding to the current block from an image having a view-point 0, which has been taken at the same time as the image having the view-point 1, and also if the current block belongs to an image having a view-point 2, the multi-view image encoding apparatus 300 selects a block corresponding to the current block from the image having the view-point 0. If the current block belongs to an image having a view-point 3, the multi-view image encoding apparatus selects a block corresponding to the current block from the image having the view-point 2, and also, if the current block belongs to an image having a view-point 4, the multi-view image encoding apparatus selects a block corresponding to the current block, from the image having the view-point 2. If the current block belongs to images having view-points 5 and 6, the multi-view image encoding apparatus selects a block corresponding to the current block from the image having the view-point 4. Finally, if the current block belongs to an image having a view-point 7, the multi-view image encoding apparatus selects a block corresponding to the current block from the image having the view-point 6.

However, the method described above with reference to FIG. 4 is provided as an example, and the present invention is not limited thereto.

Returning to FIG. 3, the encoding unit 320 encodes the current block based on block information of a block from among the selected block and blocks adjacent to the selected block. In detail, the current block is encoded using a predetermined method, according to block information of a block from among the selected block and the adjacent blocks. That is, the current block may be encoded using the block information of a block from among the selected block and the adjacent blocks. A block, the block information of which is to be used for encoding from among the selected block and the adjacent blocks, is determined by rate-distortion (R-D) cost. If a block containing block information that is to be used for encoding the current block has been encoded using intra prediction, the current block is also encoded using intra prediction. If the block containing block information that is to be used for encoding the current block has been encoded using temporal prediction, the current block is also encoded using temporal prediction.

The type of the block information that is to be used for encoding the current block is not limited. For example, the block information can include at least one of a prediction mode used to encode the selected block, a motion vector used for inter-view prediction or temporal prediction, and a reference index.

Since the current block is encoded using the block information of another block, block information for the current block needs not to be generated. Details thereof will be described later with reference to FIG. 7.

If it is determined that encoding the current block according to the block information of the corresponding block has a low rate-distortion (R-D) cost rather than encoding the current block using intra prediction, inter-view prediction, or temporal prediction which is a general prediction method for multi-view images, the current block is encoded using the block information of the corresponding block.

Figure 5:
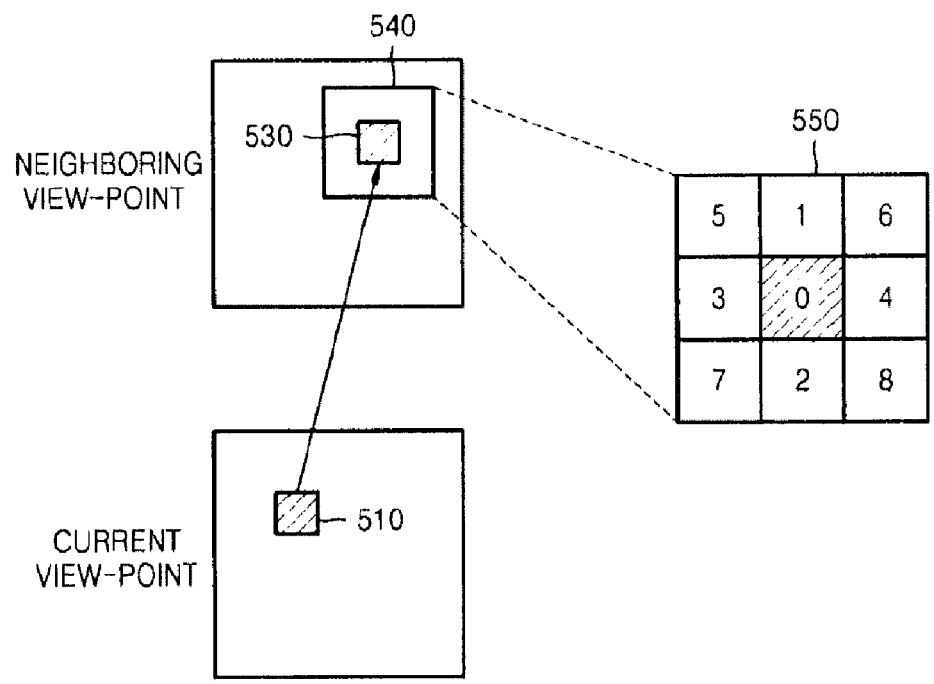
FIG. 5 is a view for illustrating a method of encoding a current block, according to an exemplary embodiment of the present invention.

FIG. 5 is a view for illustrating a method of encoding a current block 510, according to an exemplary embodiment of the present invention.

FIG. 5 is a view for also illustrating a method for selecting blocks having a neighboring view-point that are to be used by the encoding unit 320 (see FIG. 3) to encode the current block 510.

Referring to FIGS. 3 and 5, the selection unit 310 selects a block 530 corresponding to the current block 510 from an image having a neighboring view-point, according to a global disparity vector. Then, the encoding unit 320 encodes the current block 510, using block information of a block from among the selected block 530 and blocks 540 that are adjacent to the selected block 530.

Accordingly, the encoding unit 320 can encode the current block 510 by using not only block information of the block 530 selected according to the global disparity vector but also block information of the blocks 540 that are adjacent to the selected block 530.

The number of the adjacent blocks 540 whose block information is used for encoding can be changed. As illustrated in FIG. 5, a total of 9 blocks including the block 530 and the adjacent blocks 540 can be used to encode the current block 510. It is possible to also use more than 9 blocks for encoding the current block 510. It is possible to also use only some of the 8 adjacent blocks for encoding the current block 510, instead of using all the 8 adjacent blocks. In this case, the current block 510 is encoded using only block information of a part of blocks having high correlation to the current block 510.

Indexes are assigned to the block 530 and the adjacent blocks 540, in order to indicate a block whose block information is used to encode the current block 510. This will be described later in more detail with reference to FIG. 7.

Returning to FIGS. 3, and 5, the encoding unit 320 encodes information regarding an encoding mode of the current block 510, while encoding the current block 510 using the block information of a block from among the block 530 and the adjacent blocks 540. The information regarding the encoding mode of the current block 510 is flag information indicating that the current block 510 has been encoded using the block information of a block from among the block 530 and the blocks 540. This will be described in detail with reference to FIG. 6, below.

Figure 6:
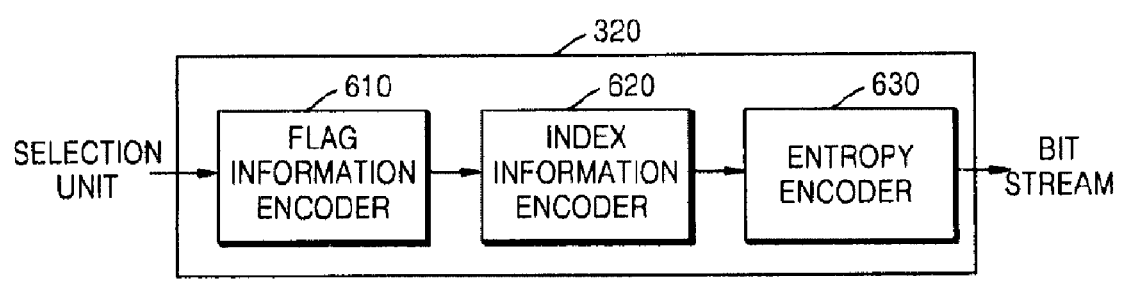
FIG. 6 is a block diagram of an encoding unit according to an exemplary embodiment of the present invention.

FIG. 6 is a block diagram of the encoding unit 320 according to an exemplary embodiment of the present invention.

Referring to FIG. 6, the encoding unit 320 includes a flag information encoder 610, an index information encoder 620, and an entropy encoder 630.

The flag information encoder 610 encodes flag information indicating an encoding mode of a current block that is to be encoded on the basis of block information of at least one from among a block selected by the selection unit 310 (see FIG. 3) and blocks adjacent to the selected block. That is, the flag information encoder 610 encodes flag information indicating that a current block is encoded on the basis of block information of a block from among a block selected according to a global disparity vector and blocks adjacent to the selected block, without using intra prediction or inter-view prediction which is a general prediction method for multi-view images.

Since a current block is encoded using block information of another block selected according to a global disparity vector, block information of the current block needs not to be inserted into a bit stream. The reason for this is that the flag information substitutes for block information of the current block. The flag information may be contained in a macro block header or a slice header. A method of inserting flag information into a macro block header will be described later in detail with reference to FIG. 7.

In addition to the flag information contained in the macro block header, other flag information may be inserted into a slice header so that whether an encoding mode illustrated in FIG. 5 according to the present invention is to be applied can be indicated in units of slices. Insertion of the flag information into the slice header enables control of whether the encoding mode illustrated in FIG. 5 is to be applied in units of slices.

For example, "MB_info_skip_enable" syntax may be added to a slice header. If "MB_info_skip_enable=1", it means that at least one from among blocks contained in a current slice has been encoded according to an encoding mode in which one block is encoded using block information of another block. If "MB_info_skip_enable=0", it means that none of the blocks contained in a current slice have been encoded according to the encoding mode. In this case, 'mbinfo_skip_flag' and 'ref_mb_pos' syntaxes, which will be described later with reference to FIG. 7, need not be encoded with respect to any of the blocks in the current slice.

The index information encoder 620 encodes index information indicating which block, from among the block selected according to the global disparity vector and the blocks adjacent to the selected block, corresponds to the block information used to encode the current block. The index information is needed when the current block is encoded using not only the block information of the block selected by the selection unit 310 but also the block information of the blocks adjacent to the selected block.

The encoding unit 320 can encode the current block, using not only block information of the block selected by the global disparity vector but also the blocks adjacent to the selected block. Thus, in this case, the encoding unit 320 also encodes index information designating a block that is to be used to encode the current block, from among the blocks.

The entropy encoder 630 encodes the flag information generated by the flag information encoder 610 and the index information generated by the index information encoder 620. Then, the entropy encoder 630 binarizes the flag information and the index information, performs context-based adaptive arithmetic coding (CABAC) on the binarized flag information and index information, and inserts the result into a bit stream.

FIG. 7 illustrates syntax for generating block information, according to an exemplary embodiment of the present invention.

In FIG. 7, Q99402-Re syntax, which is generated by the encoding unit 320 to generate flag information and index information, is illustrated. Referring to FIG. 7, the encoding unit 320 generates flag information "mbinfo_skip_flag" and index information "ref_mb_pos".

The flag information "mbinfo_skip_flag" indicates whether a current block has been encoded using block information of a block from among a selected block according to a global disparity vector and blocks adjacent to the selected block.

Since a current block is encoded using block information of another block, block information of the current block needs not to be generated. Accordingly, flag information indicating that block information of the current block is skipped is generated as the flag information "mbinfo_skip_flag".

The index information "ref_mb_pos" indicates a block whose block information is used to encode the current block. If the current block is encoded based on not only the block selected by the global disparity vector but also the blocks adjacent to the selected block, the index information "ref_mb_pos" indicates which block from among the above blocks corresponds to the block information used to encode the current block.

The index information "ref_mb_pos", which indicates which block from among the selected block (index 0) and the adjacent blocks (indexes 1 through 8) illustrated in FIG. 5, corresponds to the block information used to encode the current block, is inserted into a bit stream.

Referring to FIG. 5, numbers 0 through 8 allocated to the selected block 530 and the blocks 540 adjacent to the selected block 530 may denote priority. In other words, the allocated numbers may denote the order of blocks that are to be sequentially referred to when encoding the current block 510. If block information of the selected block 530 allocated a number 0 is identical to that of the current block 510, 'mbinfo_s-kip_flag' and 'ref_mb_pos' are set to 1 and 0, respectively. However, if the block information of the selected block 530 allocated a number 0 is not identical to that of the current block 510, block information of a block allocated a number 1, i.e., a block adjacent to the upper part of the selected block 530, is compared with the block information of the current block 510. If the comparison result reveals that the block information of the adjacent block is identical to that of the current block 510, 'mbinfo_skip_flag' and 'ref_mb_pos' are set to 1. Such a comparison is repeatedly performed from a block given a number 2 to a block given a number 8. If any block information of referred to blocks is not identical to that of the current block 510, 'mbinfo_skip_flag' is set to 1 and the block information of the current block 510 is encoded according to a conventional encoding method.

Returning to FIG. 3, the current block encoded by the encoding unit 320 is stored in the frame memory 330, and is referred to when a next block or image is encoded.

Figure 8:
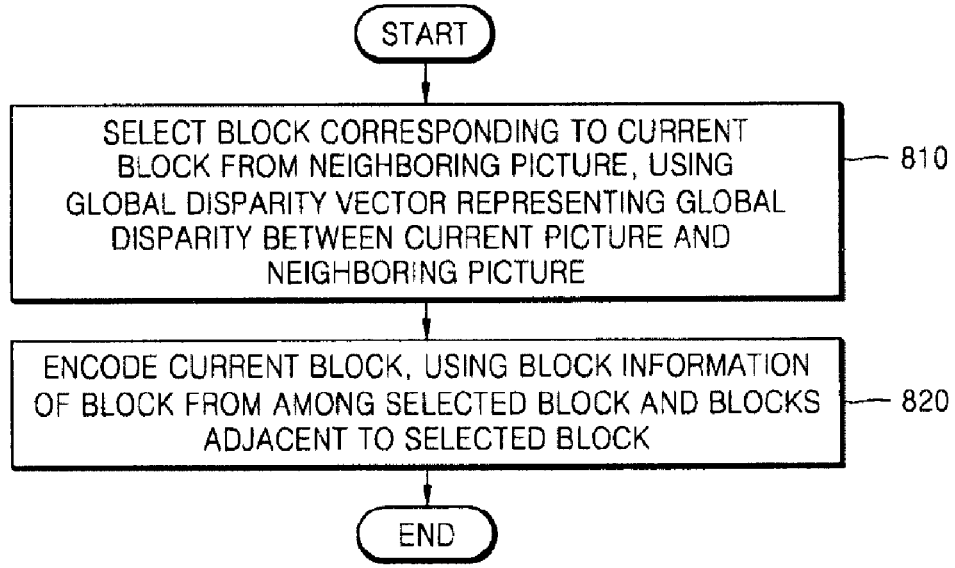
FIG. 8 is a flowchart of a multi-view image encoding method according to an exemplary embodiment of the present invention.

FIG. 8 is a flowchart of a multi-view image encoding method according to an exemplary embodiment of the present invention, wherein the multi-view image encoding method is performed by the multi-view image encoding apparatus 300 illustrated in FIG. 3.

Referring to FIG. 8, in operation 810, a block corresponding to a current block is selected from a neighboring picture of a current picture to which the current block belongs, using a global disparity vector representing a global disparity between the current picture and the neighboring picture.

In operation 820, the current block is encoded, using block information of a block from among the selected block and blocks adjacent to the selected block. That is, the current block can be encoded based on either only the block information of the selected block or the block information of a block from among the selected block and the adjacent blocks.

Figure 9:
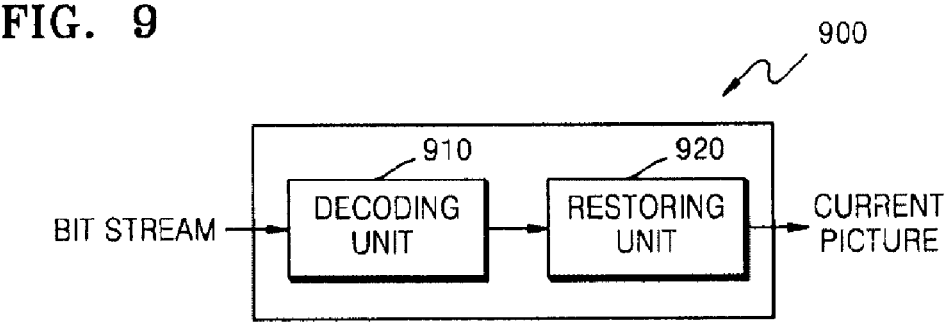
FIG. 9 is a block diagram of a multi-view image decoding apparatus according to an exemplary embodiment of the present invention.

The current block is encoded directly using the block information. Here, flag information regarding an encoding mode of the current block, and index information indicating which block corresponds to the block information used to encode the current block, are also encoded and inserted into a bit stream. The flag information and index information are entropy-encoded and inserted into the bit stream. The flag information that is encoded may be flag information inserted into a macro block header, as illustrated in FIG. 7. Also, separately, the flag information indicating that at least one of blocks contained in a current slice has been encoded according to the encoding mode described above with reference to FIG. 5 may be encoded and inserted into a slice header. FIG. 9 is a block diagram of a multi-view image decoding apparatus 900 according to an exemplary embodiment of the present invention.

Referring to FIG. 9, the multi-view image decoding apparatus 900 includes a decoding unit 910 and a restoring unit 920.

The decoding unit 910 receives a bit stream including data about a current block, and extracts the data about the current block from the bit stream.

The data about the current block includes data about a residual block generated by prediction-encoding the current block, and information regarding an encoding mode of the current block. The residual block is generated by selecting a block corresponding to the current block from another picture having a view-point which is different from the view-point of the current picture, on the basis of a global disparity vector indicating a global disparity between a current picture to which the current block belongs and the other picture, and prediction-encoding the current block on the basis of block information of a block from among the selected block and blocks adjacent to the selected block.

The information regarding an encoding mode of the current block includes flag information indicating that the current block is encoded according to an encoding mode according to the present invention, and index information for designating a block used to encode the current block. The index information is included when the block information of the adjacent blocks is also used in the encoding of the current block.

The decoding unit 910 determines whether a current slice includes a block encoded using an encoding method according to the present invention, based on flag information contained in a slice header. If the flag information in the slice header indicates that the current slice does not include a block encoded using the encoding method, there is no need to extract the flag information and the index information from the block header of the current block.

Then, the decoding unit 910 performs entropy decoding, inverse-transformation, and dequantization on the data about the residual block, thereby decoding the data about the residual block. The decoding unit 910 performs entropy-decoding (that is, CABAC decoding) on the flag information and the index information of the current block.

The restoring unit 920 restores the current block on the basis of the data about the current block extracted by the decoding unit 910.

The block information of the current block includes the flag information and the index information. Thus, the restoring unit 920 restores the current block, using block information of a block among a block having a neighboring view-point corresponding to the current block and blocks adjacent to the block having the neighboring view-point, with reference to the flag information in the slice header, the flag information in the block header, and the index information.

The restoring unit 920 predicts the current block in a prediction mode according to the block information. The restoring unit 920 adds the resultant predicted block to the residual block extracted by the decoding unit 910, and thus restores the current block.

Figure 10:
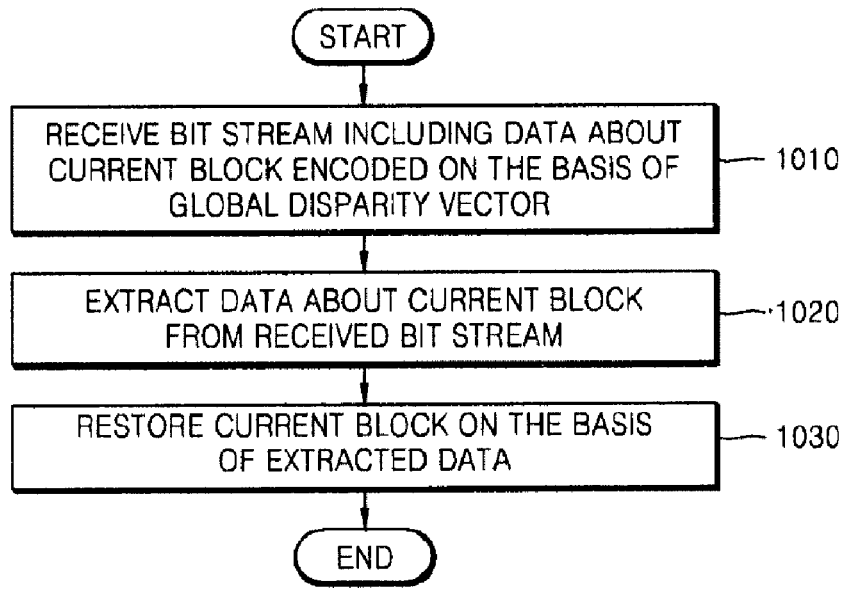
FIG. 10 is a flowchart of a multi-view image decoding method according to an exemplary embodiment of the present invention.

FIG. 10 is a flowchart of a multi-view image decoding method according to an exemplary embodiment of the present invention, wherein the multi-view image decoding method is performed by the multi-view image decoding apparatus illustrated in FIG. 9.

Referring to FIG. 10, in operation 1010, a bit stream including data about a current block which has been encoded on the basis of a global disparity vector is received That is, a bit stream including data about a current block, which is obtained by selecting a block corresponding to the current block from another picture having a neighboring view-point on the basis of a global disparity vector, and encoding the current block on the basis of block information of a block from among the selected block and blocks adjacent to the selected block, is received.

In operation 1020, the data about the current block is extracted from the bit stream. That is, data about a residual block of the current block, and information of an encoding mode of the current block are extracted from the bit stream. The block information of the current block may include flag information indicating that the current block is encoded according to an encoding mode according to the present invention, and index information for designating a block used to encode the current block. Also, block information and flag information are respectively extracted from a macro block header and a slice header.

In operation 1030, the current block is restored on the basis of the data about the current block. That is, the current block is restored using the flag information included in the block information of the current block and block information of the block designated according to the index information.

The present invention can also be embodied as computer readable codes on a computer readable recording medium. The computer readable recording medium is any data storage device that can store data which can be thereafter read by a computer system. Examples of the computer readable recording medium include, but are not limited to: read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the exemplary embodiment of the present invention, since multi-view images are encoded using block information of a block corresponding to the current block having a view-point which is different from a view-point of the current picture, and block information of blocks adjacent to the corresponding block, the multi-view images can be encoded in consideration of the individual differences in the appearance of objects as well as global disparities between view-points.

Since a current block can also be encoded using block information of another block, the number of bits required to encode block information can be reduced and a compression rate of encoding can be improved.

Since whether an encoding mode in which encoding is performed directly using block information of another block is applied can be controlled in units of slices, information regarding the encoding mode can be more effectively encoded and decoded.

While a few exemplary embodiments of the present invention have been particularly shown and described, it will be understood by those of ordinary skill in the art that various changes may be made to these exemplary embodiments without departing from the principles and spirit of the invention, the scope of which is defined by the claims and their equivalents.

What is claimed is:

1. A multi-view image encoding method comprising:
   selecting, by a processor, a block corresponding to a current block from another picture having a view-point which is different from a view-point of a current picture to which the current block belongs, on the basis of a global disparity vector representing a global disparity between the current picture and the other picture; and
   encoding the current block on the basis of block information of a block from among the selected block and blocks adjacent to the selected block.

2. The method of claim 1, wherein the block information comprises at least one of a motion vector, a reference index, and a prediction mode used to encode a block from among the selected block and the blocks adjacent to the selected block.

3. The method of claim 1, wherein the encoding of the current block comprises encoding flag information indicating that the current block is encoded on the basis of block information of a block from among the selected block and the blocks adjacent to the selected block.

4. The method of claim 3, wherein the encoding of the current block further comprises encoding index information indicating which block from among the selected block and the blocks adjacent to the selected block, corresponds to the block information used to encode the current block.

5. The method of claim 4, wherein the encoding of the current block further comprises entropy-encoding the flag information and the index information.

6. The method of claim 5, wherein the entropy-encoding of the flag information and the index information comprises performing context-based adaptive arithmetic coding (CABAC) on the flag information and the index information.

7. A multi-view image encoding apparatus comprising:
   a processor comprising:
   a selection unit which selects a block corresponding to a current block from another picture having a view-point which is different from a view-point of a current picture to which the current block belongs, on the basis of a global disparity vector representing a global disparity between the current picture and the other picture; and
   an encoding unit which encodes the current block on the basis of block information of a block from among the selected block and blocks adjacent to the selected block.

8. The apparatus of claim 7, wherein the block information comprises at least one of a motion vector, a reference index, and a prediction mode used to encode a block from among the selected block and the blocks adjacent to the selected block.

9. The apparatus of claim 7, wherein the encoding unit further comprises a flag information encoding unit which encodes flag information indicating that the current block is encoded on the basis of block information of a block from among the selected block and the blocks adjacent to the selected block.

10. The apparatus of claim 9, wherein the encoding unit encodes index information indicating which block of the selected block and the blocks adjacent to the selected block, corresponds to the block information used to encode the current block.

11. The apparatus of claim 10, wherein the encoding unit further comprises an entropy encoding unit which entropy-encodes the flag information and the index information.

12. The apparatus of claim 11, wherein the entropy-encoding unit performs context-based adaptive arithmetic coding (CABAC) on the flag information and the index information.

13. A multi-view image decoding method comprising:
   receiving, by a processor, a bit stream including data about a current block which has been encoded on the basis of block information of a block from among a selected block and blocks adjacent to the selected block, wherein the selected block corresponding to the current block is selected from another picture having a view-point which is different from a view-point of a current picture to which the current block belongs, on the basis of a global disparity vector representing a global disparity between the current picture and the other picture;

extracting the data about the current block from the bit stream; and restoring the current block on the basis of the data about the current block.

14. The method of claim 13, wherein the data about the current block comprises flag information indicating that the current block is encoded on the basis of the block information of a block from among the selected block and the blocks adjacent to the selected block.

15. The method of claim 14, wherein the data about the current block further comprises index information indicating which block from among the selected block and the blocks adjacent to the selected block, corresponds to the block information used to encode the current block.

16. The method of claim 15, wherein the restoring of the current block restores the current block on the basis of block information of a block designated by the index information.

17. A multi-view image decoding apparatus comprising:
a processor comprising:
a decoding unit which receives a bit stream including data about the current block which has been encoded on the basis of block information of a block from among a selected block and blocks adjacent to the selected block, wherein the selected block corresponding to the current block is selected from another picture having a view-point which is different from a view-point of a current picture to which the current block belongs, on the basis of a global disparity vector representing a global disparity between the current picture and the other picture, and which extracts the data about the current block from the bit stream; and
a restoring unit which restores the current block on the basis of the data about the current block.

18. The apparatus of claim 17, wherein the data about the current block comprises flag information which indicates that the current block is encoded on the basis of the block information of a block from among the selected block and the blocks adjacent to the selected block.

19. The apparatus of claim 18, wherein the data about the current block further comprises index information which indicates which block from among the selected block and the blocks adjacent to the selected block, corresponds to the block information used to encode the current block.

20. The apparatus of claim 19, wherein the restoring unit restores the current block on the basis of block information of a block designated by the index information.

21. A non-transitory computer-readable recording medium having embodied thereon a program for executing the method of claim 1.

22. A non-transitory computer-readable recording medium having embodied thereon a program for executing the method of claim 13.

23. A multi-view image encoding method comprising:
selecting, by a processor, a block corresponding to a current block from another picture having a view-point which is different from a view-point of a current picture to which the current block belongs, on the basis of a global disparity vector representing a global disparity between the current picture and the other picture;
encoding the current block according to an encoding mode in which a block is encoded on the basis of block information of the selected block; and
encoding flag information indicating that at least one of blocks contained in a current slice to which the current block belongs has been encoded according to the encoding mode.

24. The method of claim 23, wherein the block information comprises at least one of a prediction mode, a motion vector, and a reference index, which are used to encode the selected block.

25. The method of claim 23, wherein the flag information is included in a slice header of the current slice.

26. The method of claim 23, wherein the encoding of the flag information further comprises encoding flag information indicating whether the current block has been encoded according to the encoding mode.

27. A multi-view image encoding apparatus comprising:
a processor comprising:
a selection unit which selects a block corresponding to a current block from another picture having a view-point which is different from a view-point of a current picture to which the current block belongs, on the basis of a global disparity vector representing a global disparity between the current picture and the other picture; and
an encoding unit which encodes the current block according to an encoding mode in which a block is encoded on the basis of block information of the selected block,
wherein the encoding unit further encodes flag information indicating that at least one of blocks contained in a current slice to which the current block belongs has been encoded according to the encoding mode.

28. The apparatus of claim 27, wherein the block information comprises at least one of a prediction mode, a motion vector, and a reference index which are used to encode the selected block.

29. The apparatus of claim 27, wherein the flag information is included in a slice header of the current slice.

30. The apparatus of claim 27, wherein the encoding unit encodes flag information indicating whether the current block has been encoded according to the encoding mode.

31. A multi-view image decoding method comprising:
receiving, by a processor, a bit stream including data about a current block which has been encoded on the basis of block information of a block corresponding to the current block, wherein the corresponding block is selected from another picture having a view-point which is different from a view-point of a current picture to which the current block belongs, on the basis of a global disparity vector representing a global disparity between the current picture and the other picture;
extracting data regarding a residual block of the current block and information regarding an encoding mode from the received bitstream; and
restoring the current block on the basis of the data about the residual block and the information regarding the encoding mode,
wherein the information regarding the encoding mode comprises flag information indicating that the at least one of blocks included in a current slice to which the current block belongs has been encoded according to the encoding mode.

32. The method of claim 31, wherein the flag information is included in a slice header of the current slice.

33. The method of claim 31, wherein the information regarding the encoding mode comprises flag information indicating whether the current block has been encoded according to the encoding mode.

34. A multi-view image decoding apparatus comprising:
a processor comprising:
a decoding unit which receives a bit stream including data about a current block which has been encoded on the basis of block information of a block corresponding to the current block, and then extracts data about a residual block of the current block and information regarding an encoding mode from the bit stream, where the corresponding block is selected from another picture having a view-point which is different from a view-point of a current picture to which the current block belongs, on the basis of a global disparity vector representing a global disparity between the current picture and the other picture; and a restoring unit which restores the current block on the basis of the data about the residual block and the information regarding the encoding mode, wherein the information regarding the encoding mode comprises flag information indicating that at least one of blocks included in a current slice to which the current block belongs has been encoded according to the encoding mode.

35. The apparatus of claim 34, wherein the flag information is included in a slice header of the current slice.

36. The apparatus of claim 34, wherein the information regarding the encoding mode comprises flag information indicating whether the current block has been encoded according to the encoding mode.

37. A non-transitory computer-readable recording medium having embodied thereon a program for executing the method of claim 23.

38. A non-transitory computer-readable recording medium having embodied thereon a program for executing the method of claim 31.

* * * * *